(12) United States Patent
Messica et al.

(10) Patent No.: US 6,909,824 B1
(45) Date of Patent: Jun. 21, 2005

(54) MECHANICALLY ACTUATED EVANESCENT-WAVE COUPLED OPTICAL DEVICES

(75) Inventors: Avi Messica, 12 Pecan Street, Tel-Mond (IL), 40600; Asnat Messica, Tel-Mond (IL)

(73) Assignee: Avi Messica, Telmond (IL)

( * ) Notice: Subject to any disclaimer, the term of this patent is extended or adjusted under 35 U.S.C. 154(b) by 306 days.

(21) Appl. No.: 10/093,369

(22) Filed: Mar. 6, 2002

Related U.S. Application Data (63) Continuation-in-part of application No. 10/091,604, filed on Mar. 5, 2002, now abandoned.

(51) Int. Cl.[7] .............................. G02B 6/26; G02B 6/42
(52) U.S. Cl. .............................. 385/30; 385/15; 385/16; 385/27; 385/39
(58) Field of Search ......................... 385/12–13, 15–17, 385/27, 30, 39

(56) References Cited

U.S. PATENT DOCUMENTS

| | | | |
|---|---|---|---|
| 4,007,978 A | | 2/1977 | Holton |
| 4,360,247 A | * | 11/1982 | Beasley ...................... 385/13 |
| 4,461,536 A | * | 7/1984 | Shaw et al. ................... 385/12 |
| 4,679,894 A | | 7/1987 | Pavlath |
| 4,842,368 A | | 6/1989 | Darcie et al. |
| 4,940,305 A | | 7/1990 | Thaniyavarn |
| 5,123,027 A | * | 6/1992 | Lawrence ..................... 372/92 |
| 5,533,155 A | | 7/1996 | Barberio et al. |
| 5,581,642 A | | 12/1996 | Deacon et al. |
| 5,781,670 A | | 7/1998 | Deacon et al. |
| 5,970,186 A | | 10/1999 | Kenney et al. |
| 6,002,704 A | | 12/1999 | Freitag et al. |
| 6,014,477 A | | 1/2000 | Barber et al. |
| 6,212,314 B1 | | 4/2001 | Ford |
| 6,304,697 B1 | * | 10/2001 | Toyohara ..................... 385/50 |
| 6,438,282 B1 | * | 8/2002 | Takeda et al. ................. 385/16 |
| 6,490,391 B1 | * | 12/2002 | Zhao et al. .................... 385/30 |
| 6,594,425 B2 | * | 7/2003 | Tapalian et al. .............. 385/50 |
| 2002/0039467 A1 | * | 4/2002 | Amantea ..................... 385/16 |
| 2002/0048423 A1 | | 4/2002 | Frick et al. |
| 2002/0094168 A1 | * | 7/2002 | Cai et al. ..................... 385/43 |

FOREIGN PATENT DOCUMENTS

| | | |
|---|---|---|
| WO | WO 98/53535 A1 | 11/1998 |
| WO | WO 00/35057 A3 | 6/2000 |
| WO | WO 00/35057 A2 | 6/2000 |

OTHER PUBLICATIONS

Beck et al. "GaAs/AlGaAs self–sensing cantilevers for low temperature scanning probe microscopy." Applied Physics Letters, 1998, pp. 1149–1151, vol. 73, No. 8, American Institute of Physics.

rugger et al. "Microlever with combined integrated sensor/ actuator functions for scanning force microscopy." Sensors and Actuators A 43, 1994, pp. 339–345, Elsevier Science S.A.

Chu et al. "Cascaded microring resonators for crosstalk reduction and spectrum cleanup in add–drop filters." IEEE Photonics Technology Letters, Nov. 1999, pp. 1423–1425, vol. 11, No. 11.

(Continued)

*Primary Examiner*—John D. Lee
*Assistant Examiner*—Tina M Lin
(74) *Attorney, Agent, or Firm*—Swernofsky Law Group PC (57) ABSTRACT

Apparatus using mechanically-actuated evanescent wave coupling. At least a portion of an optical waveguide is integrated onto a substrate, and an optically active element is physically moved relatively to each other, with the result that propagation parameters for the waveguide are substantially altered. The optically active element may be a resonator or another waveguide. Altered propagation parameters can be used to cause an optical wave to be transformed in response to an electromagnetic signal. Physical parts of the apparatus can vary widely in both size and tolerance. The optically active element is mechanically actuated relative to a position of the optical waveguide.

72 Claims, 9 Drawing Sheets

OTHER PUBLICATIONS

Chu et al. "Second–order filter response from parallel coupled glass microring resonators." IEEE Photonics Technology Letters, Nov. 1999, pp. 1426–1428, vol. 11, No. 11.

Deri et al. "Scattering in low–loss GaAs/AlGaAs rib waveguides." Applied Physics Letters, Sep. 14, 1987, pp. 789–791, vol. 51 No. 11, American Institute of Physics.

Hryniewicz et al. "Higher order filter response in coupled microring resonators." IEEE Photonics Technology Letters, Mar. 2000, pp. 320–322, vol. 12, No. 3.

Ho et al. "Large nonlinear phase shifts in low–loss $Al_xGa_{1-x}As$ waveguides near half–gap." Applied Physics Letters, Nov. 11, 1991, pp. 2558–2560, vol. 59, No. 20, American Institute of Physics.

Islam et al. "Nonlinear spectroscopy near half–gap in bulk and quantum well GaAs/AlGaAs waveguides." Journal of Applied Physics, Feb. 15, 1992, pp. 1927–1935, vol. 71, No. 4, American Institute of Physics.

Little et al. "Microring resonator arrays for VLSI photonics." IEEE Photonics Technology Letters, Mar. 2000, pp. 323–325, vol. 12, No. 3.

Little et al. "Microring resonator channel dropping filters." Journal of Lightwave Technology, Jun. 1997, pp. 998–1005, vol. 15, No. 6, IEEE.

Little et al. "Second–order filtering and sensing with partially traveling waves in a single resonator." Optics Letters, Oct. 15, 1998, pp. 1570–1572, vol. 23, No. 20, Optical Society of America.

Liu et al. "Scaling laws of microactuators and potential applications of electroactive polymers in MEMS." Proceedings of SPIE's $6^{th}$ Annual International Symposium on Smart Structures and Materials, Mar. 1–5, 1999, Newport, pp. 1–10.

Madsen et al. "Integrated all–pass filters for tunable dispersion and dispersion slope compensation." IEEE Photonics Technology Letters, Dec. 1999, pp. 1623–1625, vol. 11, No. 12.

Manalis et al. "Interdigital cantilevers for atomic force microscopy." Applied Physics Letters, Dec. 16, 1996, pp. 3944–3946, vol. 69, No. 25, American Institute of Physics.

Marcatili. "Bends in optical dielectric guides." The Bell System Technical Journal, Sep. 1969, pp. 2103–2132, vol. 48.

Marxer et al. "MEMS–based fibre optic switches enhance network safety." Europhotonics, Dec./Jan. 2002, pp. 30–31.

McCall et al. "Whispering–gallery mode microdisk lasers." Applied Physics Letters, Jan. 20, 1992, pp. 289–291, vol. 60, No. 3, American Institute of Physics.

Noda. "Thermal stresses in functionally graded materials." Journal of Thermal Stresses [abstract], 1999, pp. 477, vol. 22, Nos. 4–5.

Park et al. "Bent–beam electrothermal actuators—part II: Linear and rotary microengines." Journal of Microelectromechanical Systems, Jun. 2001, pp. 255–261, vol. 10, No. 2.

Que et al. "Bent–beam electrothermal actuators—Part I: Single beam and cascaded devices." Journal of Microelectromechanical Systems, Jun. 2001, pp. 247–254, vol. 10, No. 2.

Slooff et al. "Pumping planar waveguide amplifiers using a coupled waveguide system." Journal of Lightwave Technology, Nov. 2001, pp. 1740–1123, vol. 19, No. 11.

Soref et al. "Proposed N–wavelength M–fiber WDM cross-connect switch using active microring resonators." IEEE Photonics Technology Letters, Aug. 1998, pp. 1121–1123, vol. 10, No. 8.

Tishinin et al. "Vertical resonant couplers with precise coupling efficiency control fabricated by wafer bonding." IEEE Photonics Technology Letters, Aug. 1999, pp. 1003–1005, vol. 11, No. 8.

Urquhart. "Compound optical–fiber–based resonators." Journal of the Optical Society of America, Jun. 1988, pp. 803–812, vol. 5, No. 6.

Van et al. "Propagation loss in single–mode GaAs–AlGaAs microring resonators: measurement and model." Journal of Lightwave Technology, Nov. 2001, pp. 1734–1739, vol. 19, No. 11.

Yamamoto et al. "Optical processes in microcavities." Physics Today, Jun. 1993, pp. 66–73, American Institute of Physics.

* cited by examiner

MECHANICALLY ACTUATED EVANESCENT-WAVE COUPLED OPTICAL DEVICES

This application is a continuation in part of U.S. Ser. No. 10/091,604, filed on 5, Mar. 2002, abandoned 12 June 2002.

BACKGROUND OF THE INVENTION

1. Field of the Invention

The invention relates to mechanically actuated evanescent-wave coupled optical devices.

2. Related Art

When propagating optical waves (such as through an optical waveguide integrated onto a substrate), it is desirable to be able to switch, modulate, or otherwise transform, those optical waves in response to a signal, such as can easily be done when propagating electromagnetic signals. However, optical waves are not conveniently coupled to electromagnetic signals (whether control signals or data signals), particularly when those optical waves are being propagated using elements integrated onto a substrate.

One method shown in U.S. Pat. No. 6,009,115 attempts (see U.S. Patent and references therein) to switch optical waves in response to electromagnetic control signals using an electro-optical coupling. In this method, an electromagnetic control signal is applied to change the electro-optical properties of a semiconductor (such as its refractive index), so as to promote coupling between a first optical waveguide and a second optical waveguide. However, this method is subject to the drawback that it uses relatively high-precision (for patterning, placement, and fabrication) with respect to the position of the optical waveguides and the electromagnetic elements, with a result that manufacturing is relatively more difficult and less reliable.

SUMMARY OF THE INVENTION

The invention includes apparatus, and methods for making and using the same, which operate using mechanically-actuated evanescent wave coupling. In one embodiment, at least a portion of an optical waveguide is integrated onto a substrate, and an optical device or element (such as an resonator, for example one shaped in the form of a disk or a ring, or such as a second optical waveguide) are physically moved relatively to each other, with the result that propagation parameters for the waveguide are substantially altered. Altered propagation parameters (such as phase delay or coupling with another waveguide) within the waveguide can be used to cause an optical wave propagated by the waveguide to be sensed, switched, modulated, or otherwise transformed, in response to a control or data signal; the control or data signal might be electromagnetic, optical, sonic, or another type of signal. Active elements such as amplifiers, laser, or photodiodes, can also be coupled to the system. Physical parts of the apparatus can vary widely in both size and tolerance, with a result that manufacturing is relatively reliable and robust.

In an aspect of the invention, the optical device or element is mechanically actuated relative to a position of the optical waveguide. (This can include moving a resonator relative to the waveguide, moving a second waveguide relative to the waveguide, moving both the resonator and the waveguide, or some combination thereof.) In one embodiment, mechanical actuation is responsive to an electrostatic effect, with the result that at least a portion of the apparatus is moved in response to a voltage differential. However, there is no particular requirement for using an electrostatic force. In alternative embodiments, mechanical actuation may be responsive to other effects, either individually or in combination or conjunction with an electrostatic effect or one another. These other effects may include an electro-magnetic effect, a magnetic effect, a piezoelectric effect, or a thermal effect or any other effect with a result that at least a portion of the apparatus is movable.

In an aspect of the invention, the optical device or element is actuated linearly with respect to a characteristic direction of the element, toward or away from the waveguide. In one embodiment, linear actuation of a micro-shaft has the effect of moving the optical device or element. However, there is no particular requirement for using linear actuation toward or away from the waveguide. In alternative embodiments, actuation may be triggered in other directions, either individually or in combination or conjunction with linear actuation or one another. These other directions may include a linear movement parallel to the waveguide, an angular movement in which the angle is parallel to the waveguide, an angular movement in which the angle is perpendicular to (or otherwise not parallel with) the waveguide, or another movement in any of the X, Y, or Z directions relative to the apparatus.

In an aspect of the invention, the optical device or element has an effect on coupling or transfer of optical energy from the waveguide to a second waveguide. In one element, the waveguide and the second waveguide can be disposed at a substantial angle, with the result that optical energy is switched from the waveguide to the second waveguide. However, there is no particular requirement for actually transferring substantial optical energy between or among waveguides. For example, in alternative embodiments, the optically active element may have the effect of altering other properties of optical energy in the waveguide, either individually or in combination or conjunction with linear actuation or one another. These other properties may include amplitude or intensity, phase, group velocity, wave-vector properties, energy distribution across frequencies, or any other property of optical energy.

In one embodiment, the waveguide and the optical device or element use single-mode operation. However, there is no particular requirement for operating in single mode. Alternative embodiments may use multi-mode operation or a combination or conjunction of single-mode and multi-mode operation, for the waveguide, the optical device or element, or both.

BRIEF DESCRIPTION OF THE DRAWINGS

FIG. 1 (collectively including FIGS. 1A, 1B, 1C, and 1D) shows a diagram of one system including mechanically actuated evanescent-wave coupled optics.

FIG. 3 (collectively including FIGS. 3A and 3B) shows a diagram of another system including mechanically actuated evanescent-wave coupled optics.

FIG. 4 (collectively including FIGS. 4A, 4B, 4C, and 4D) shows a diagram of another system including mechanically actuated evanescent-wave coupled optics.

FIG. 5 (collectively including FIGS. 5A and 5B) shows a block diagram of an OADM (optical add-drop module) including mechanically actuated evanescent-wave coupled optics.

DETAILED DESCRIPTION OF THE PREFERRED EMBODIMENT

In the description herein, a preferred embodiment of the invention is described, including preferred process steps, materials and structures. Those skilled in the art would realize, after perusal of this application, that embodiments of the invention might be implemented using a variety of other techniques not specifically described, without undue experimentation or further invention, and that such other techniques would be within the scope and spirit of the invention.

Lexicography

The following terms relate or refer to aspects of the invention or its embodiments. The general meaning of each of these terms is intended to be illustrative and in no way limiting.

disk or ring—In general, these refer to any shape substantially having a disk or ring shape, but is not restricted in any way to a symmetrical or a smooth shape. For example, a disk or ring might include a polygon (such as a hexagon, pentagon, or square), or might include an asymmetric shape (such as an ellipse or rectangle).

evanescent-wave coupled optics—In general, this refers to any technique in which optical energy is coupled using an evanescent wave field. This is distinct from direct transfer of optical energy between a first waveguide and a second waveguide that are lined up end to end. For example, where there are two elements A and B, evanescent wave coupling can occur between A and B with the effect of transferring optical energy from A to B, from A to B and back to A, or otherwise having an effect on optical properties of A. An optical element can also be coupled from one part of itself to another part of itself, as for example if a waveguide has a loop disposed therein.

first waveguide and second waveguide—In general, these refer to any elements in which a first waveguide region is distinguished from a second waveguide region. Specifically, the "first" and "second" waveguide might in fact be portions of the same more lengthy waveguide.

mechanically actuated—In general, this refers to any technique in which two parts are moved relative to each other, with the effect that the angle, distance, orientation, position, or other spatial relationship between the two parts is altered. For example, where the two parts are A and B, A might be moved, B might be moved, both A and B might be moved, or some third object might be moved to have an effect on the physical relationship of A and B (for example a third part might be moved in between A and B).

resonator—In general, this refers to any element having the effect of resonantly interacting with another optical element to alter a property of optical energy transfer. For example, a resonator can be used to transfer optical energy from one waveguide to another, or from a part of a waveguide to a different part. A resonator can also be used to have an effect on phase delay of optical energy, or to provide a filtering or attenuation effect.

substrate—In general, this refers to any supportive structure capable of maintaining system elements in physical positions relative to each other. For example, the system elements might be integrated onto a monolithic substrate, such as in chip manufacturing, or might be affixed to a printed circuit board, or might be manufactured using another type of substrate such as glass. There is no particular limitation in the invention to any specific material being used for a substrate.

waveguide—In general, this refers to any technique for coupling, transferring, and channeling optical energy (or other electromagnetic energy outside the visual spectrum, such as microwave, infrared, ultraviolet, X-ray, and the like), in a substantially defined path. Some leakage is allowed.

The scope and spirit of the invention is not limited to any of these definition, or to specific examples mentioned therein, but is intended to include the most general concepts embodied by these and other terms.

Switched Energy Transfer

FIG. 1 (collectively including FIGS. 1A, 1B, 1C, and 1D) shows a diagram of one system including mechanically actuated evanescent-wave coupled optics.

Figure 1A:
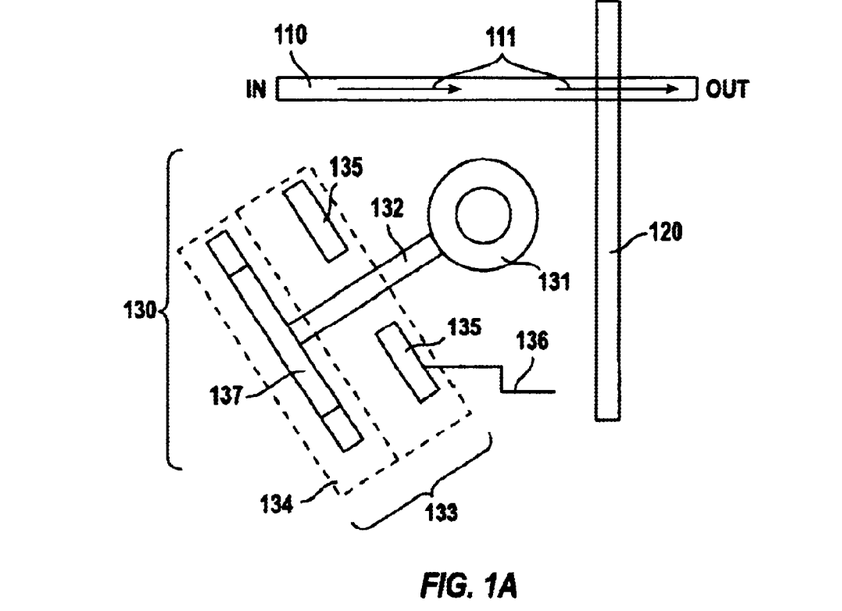

FIG. 1A shows a diagram in a first configuration, with a resonator separated from a first waveguide and a second waveguide.

Figure 1B:
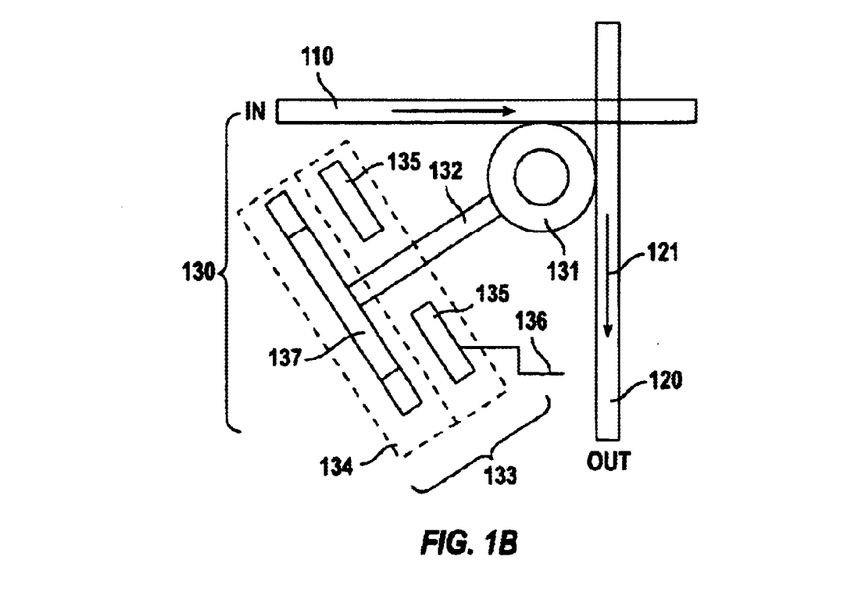

FIG. 1B shows a diagram of the system in a second configuration, with the resonator coupling the first waveguide and the second waveguide.

A system 100 includes a first waveguide 110 and a second waveguide 120, and a movable resonator 130.

The first waveguide 110 is disposed on a substrate, such as for example a monolithic integrated silicon substrate (also known as an integrated circuit or a chip), and is disposed for carrying optical energy along the waveguide. The substrate might include any type of material, such as one of the following: a semiconductor material including silicon or gallium arsenide, a dielectric material, an electro-optic material a ferroelectric material, a ferromagnetic material, a piezoelectric material, a polymer, or a thermoelectric material, or another type of material. However, there is no particular requirement that the waveguide 110 is constructed using silicon; techniques using gallium arsenide (GaAs), aluminum gallium arsenide (AlGaAs), indium phosphide, compounds, mixtures, and combinations thereof, glass, lithium niobate, and other materials, would also work. Construction of waveguides using silicon, or gallium arsenide and aluminum gallium arsenide, is known in the art of optical waveguides disposed on substrates. The waveguide 110 might be constructed using a ridge waveguide configuration or a slab waveguide configuration, each of which is known in the art of optical waveguides disposed on substrates.

In one embodiment, the waveguide 110 has a width of approximately 0.35 microns. However, there is no particular requirement for using this particular width; other values would also work.

A first waveform 111 represents optical energy within the first waveguide 110.

Similar to the first waveguide 110, the second waveguide 120 is disposed on the same substrate as the first waveguide 110, and has the same or similar material, form, and size. However, there is no particular requirement that the second waveguide 120 must be nearly identical to the first waveguide 110; they can vary substantially without any serious change in the operation of the invention. Moreover, there is no particular requirement that the second waveguide 120 must be disposed on the same substrate as the first waveguide 110; for example, the second waveguide 120 may be disposed on a substrate different from the first waveguide 110, with the two substrates disposed (such as by bonding them together) so that the first waveguide 110 and the second waveguide 120 can be positioned proximate to each other.

In one embodiment, the second waveguide 120 is disposed at a substantial angle (such as approximately perpendicular) to the first waveguide 110, and is disposed on a layer different from the first waveguide 110, so that the first waveguide 110 and the second waveguide 120 are not optically coupled without use of the movable resonator 130. However, there is no particular requirement that the first waveguide 110 and the second waveguide 120 must be at right angles to each other; the invention is also applicable to forms in which the first waveguide 110 and the second waveguide 120 are parallel, skew, or otherwise disposed not physically crossing each other.

A second waveform 121 represents optical energy within the second waveguide 120.

The movable resonator 130 includes a ring resonator 131, a support 132, and an actuator 133. When positioned relatively close to the first waveguide 110 and the second waveguide 120, the ring resonator 131 causes optical coupling among the first waveguide 110, the second waveguide 120, and the resonator 131 itself, using evanescent wave coupling. When positioned relatively distant from the first waveguide 110 and the second waveguide 120, the ring resonator 131 does not cause optical coupling.

In addition to or in combination with physical movement, the movable resonator 130 might be disposed to change optical properties of the first waveguide 110 or the second waveguide 120 (or have its own optical properties changed) in response to other methods, such as electro-optic effects, thermo-optic effects, magneto-optic effects, and the like. In alternative embodiments, the first waveguide 110, the second waveguide 120, or the resonator 130 may be coated (or be otherwise deposited, doped, implanted, sputtered, or by other means altered) with a material that couples or potentiates one or more of these effects. For example, the resonator 130 may be coated with a metal, semimetal, or semiconductor, so as to be coupled to an electric field, a magnetic field, an electromagnetic field, a sonic wave, a thermal gradient, or another form of control or data signal.

In addition to or instead of optical coupling, the movable resonator 130 might be disposed to cause other alteration of properties of optical energy in the first waveguide 110 relative to the second waveguide 120. For example, if the movable resonator 130 is disposed near the first waveguide 110 but not near to the second waveguide 120, optical energy in the first waveguide 110 can be made to undergo a phase shift relative to topical energy in the second waveguide 120.

When the ring resonator 131 causes optical coupling among the first waveguide 110 and the second waveguide 120, and the resonator 131 itself, the optical coupling induces passband energy transfer between the first waveguide 110 and the second waveguide 120. The wavelengths associated with the passband are responsive to distances among the first waveguide 110, the second waveguide 120, and the resonator 130.

In one embodiment, the resonator 131 is shaped like a ring. However, there is no particular requirement for using a ring; the resonator 131 may be shaped like a disk, a sphere, a polygon, a line segment, an irregular shape, or any other structure having the operative capability of coupling to the first waveguide 110 or to the second waveguide 120 using evanescent wave coupling. There is also no particular limitation on the size of the resonator 131.

The resonator 131 is coupled to the support 132, which is coupled to the actuator 133. In one embodiment, the actuator 133 includes a base 134 and an electrostatic element 135, the latter disposed for coupling to an actuating signaler 136. A signal appearing at the actuating signaler 136 activates the electrostatic element 135, which attracts the base 134. When the base 134 moves (or bends), the support 132 moves and the resonator 131 is moved (and therefore displaced) relative to the first waveguide 110 or relative to the second waveguide 120.

In alternative embodiments, the support 132 may include more than one anchor point to the underlying substrate, or may include more than one actuating cantilever or beam, or may have the actuating cantilever or beam coupled to more than one anchor point (either at the base 134, or on the substrate, or both).

Figure 1C:
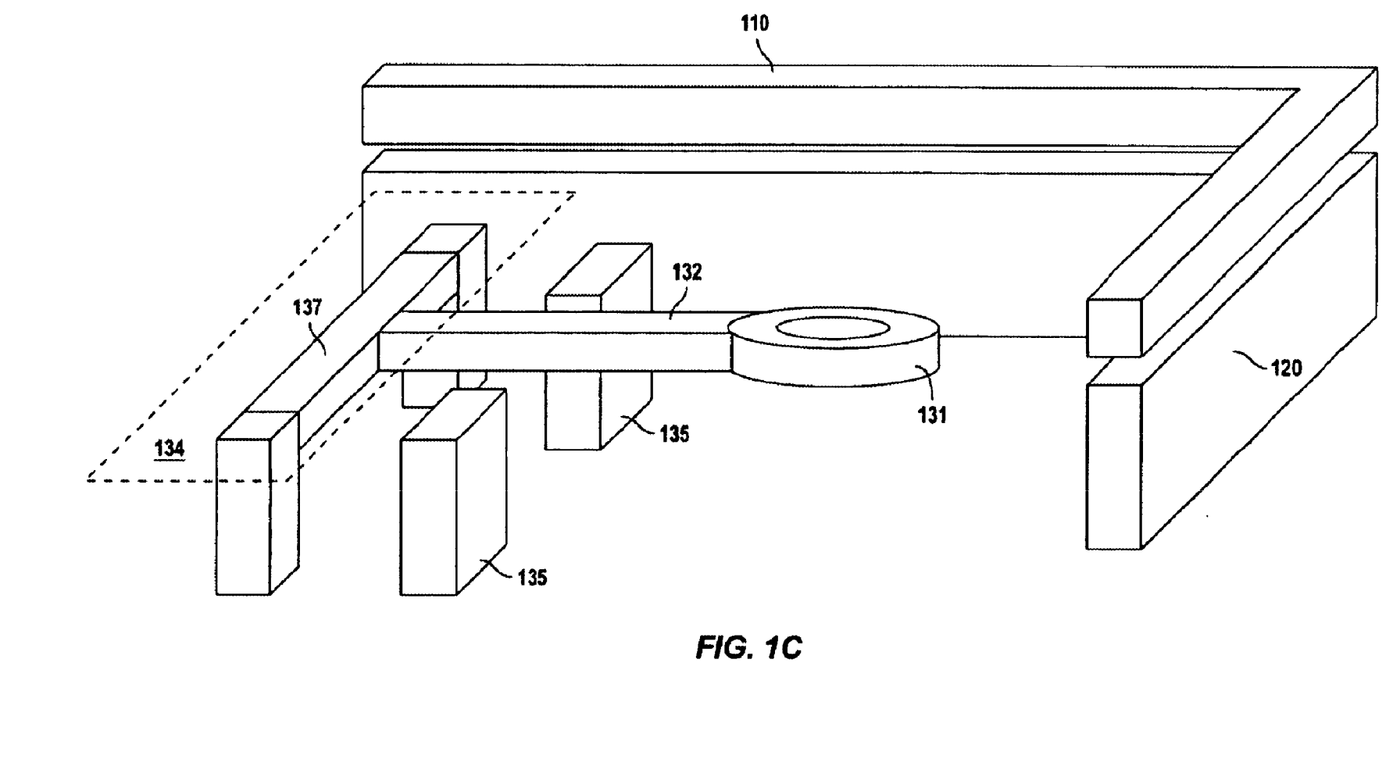

FIG. 1C shows a diagram of the actuator in a first configuration, with the resonator separated from the first waveguide and the second waveguide.

In one configuration, the base 134 includes a crossbar 137 supported above the substrate surface. When the crossbar 137 is relatively straight, the resonator 131 is separated from the first waveguide and the second waveguide. A signal appearing at the actuating signaler 136 activates the electrostatic element 135, which attracts the base 134, causing the crossbar 137 to bend.

Figure 1D:
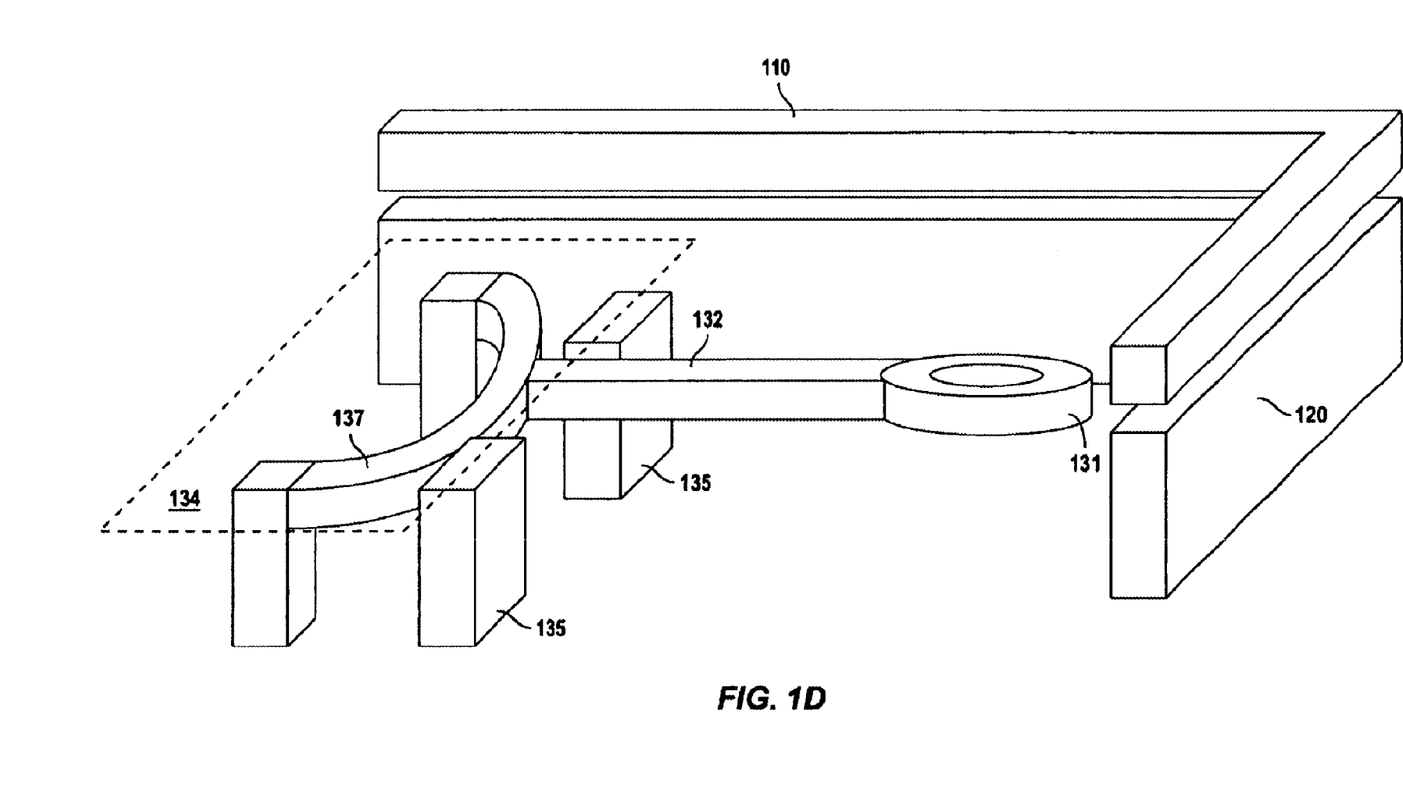

FIG. 1D shows a diagram of the actuator in a second configuration, with the resonator coupling the first waveguide and the second waveguide.

When the crossbar 137 is relatively bent, the resonator 131 is positioned relatively close to the first waveguide and the second waveguide.

Figure 2A:
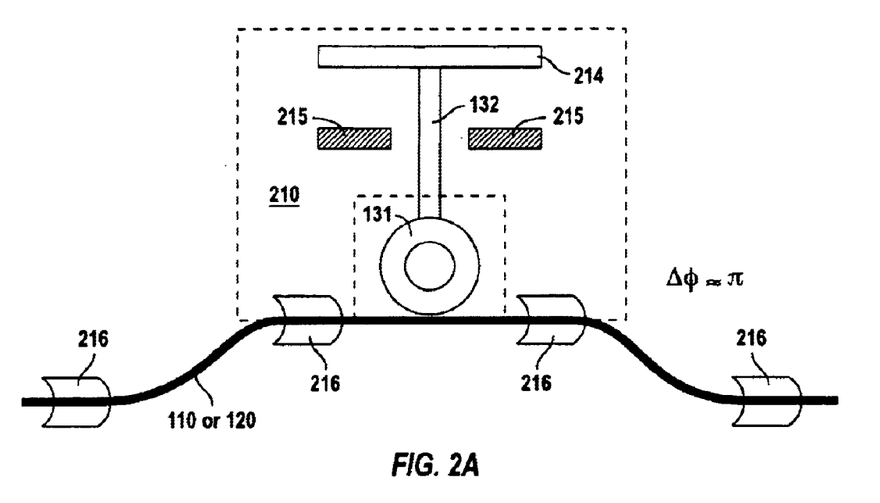
FIG. 2 (collectively including FIGS. 1A and 2B) shows a diagram of the system including alternative structures for the actuator.
Figure 2B:
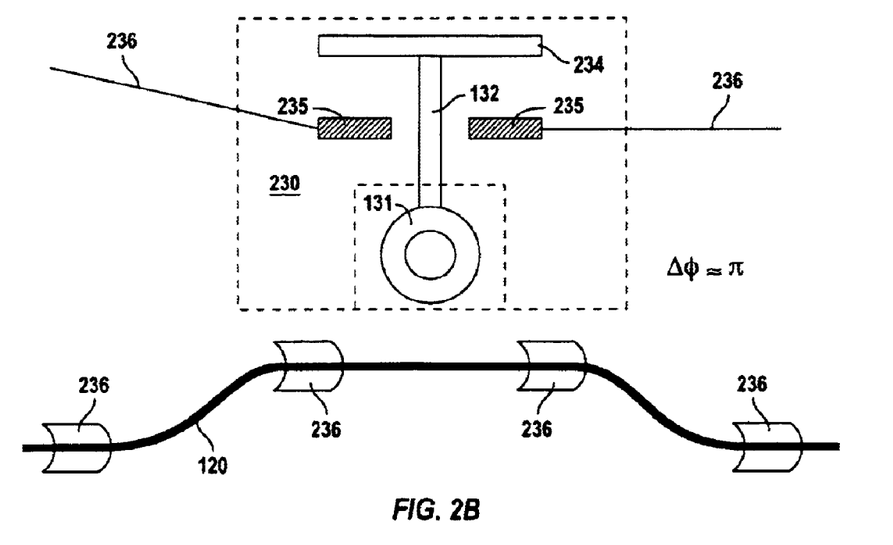

FIG. 2 (collectively including FIGS. 2A and 2B) shows a diagram of the system including alternative structures for the actuator.

FIG. 2A shows a diagram of the first system including a first angular actuator 210.

In alternative embodiments, the actuator 210 may include a base 214 and an electrostatic element 215, the latter disposed for coupling to an actuating signaler 216. Similar to the actuator 133, a signal appearing at the actuating signaler 216 activates the electrostatic element 215, which attracts the base 214. When the base 214 bends, the support 132 is displaced across an angle 220 and the resonator 131 is moved (and therefore displaced) relative to the first waveguide 110 or relative to the second waveguide 120.

FIG. 2B shows a diagram of the first system including a second angular actuator 230.

In alternative embodiments, the actuator 230 may include a base 234 and an electrostatic element 235, the latter disposed for coupling to an actuating signaler 236. Similar to the actuator 133 and the actuator 210, a signal appearing at the actuating signaler 236 activates the electrostatic element 235, which attracts the base 234. When the base 234 bends, the support 132 is displaced across an angle 220 (not shown) and the resonator 131 is moved (and therefore displaced) relative to the first waveguide 110 or relative to the second waveguide 120.

Switching Coupler

Figure 3A:
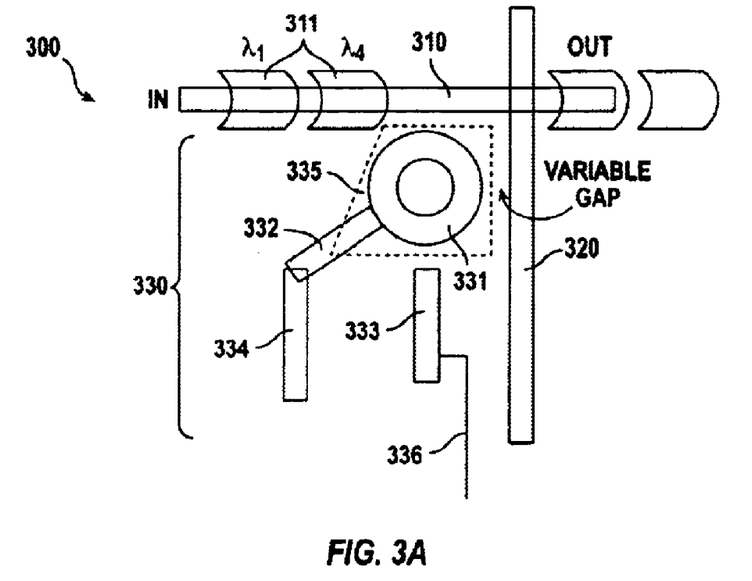
Figure 3B:
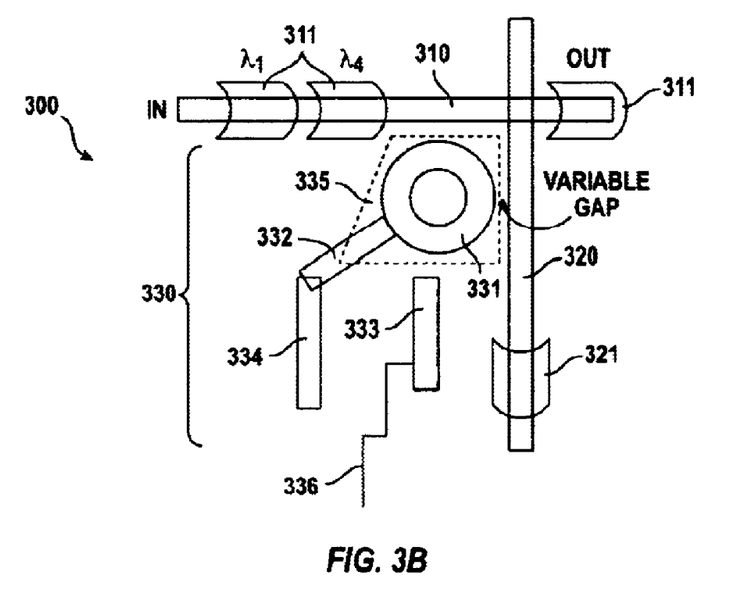

FIG. 3 (collectively including FIGS. 3A and 3B) shows a diagram of another system including mechanically actuated evanescent-wave coupled optics.

FIG. 3A shows a diagram of the system in a first configuration, with a resonator separated from a first waveguide and a second waveguide.

FIG. 3B shows a diagram of the system in a second configuration, with the resonator coupling the first waveguide and the second waveguide.

A system 300 includes a first waveguide 310 and a second waveguide 320, and a movable resonator 330.

Similar to the waveguide 110, the first waveguide 310 is disposed on a substrate, such as a monolithic integrated silicon substrate (also known as an integrated circuit or a chip), and is disposed for carrying optical energy along the waveguide. Similar to the waveguide 110, the waveguide 310 might be constructed using gallium arsenide and aluminum gallium arsenide, and might be constructed using a ridge waveguide configuration or a slab waveguide configuration.

Similar to the waveguide 110, in one embodiment, the waveguide 310 has a width of approximately 0.35 microns.

A first waveform 311 represents optical energy within the first waveguide 310.

Similar to the waveguide 120, the second waveguide 320 is disposed on the same substrate as the first waveguide 310, and has the same or similar material, form, and size.

A second waveform 321 represents optical energy within the second waveguide 320.

In one embodiment, the second waveguide 320 is disposed substantially parallel to the first waveguide 310 for at least a portion thereof.

The movable resonator 330 includes a waveguide section 331, a support 332, and an actuator 333. When positioned relatively close to the first waveguide 310, the waveguide section 331 causes optical coupling between the first waveguide 310 and the waveguide section 331 itself, using evanescent wave coupling. When positioned relatively distant from the first waveguide 310, the waveguide section 331 does not cause optical coupling.

When the waveguide section 331 causes optical coupling between the first waveguide 310 and the waveguide section 331 itself, the optical coupling induces energy transfer between the first waveguide 310 and the second waveguide 320.

Similar to the resonator 131, the resonator 331 is coupled to the support 332, which is coupled to the actuator 333. Similar to the actuator 133, the actuator 333 includes a base 334 and an electrostatic element 335, the latter disposed for coupling to an actuating signaler 336. Similar to the actuator 133, a signal appearing at the actuating signaler 336 activates the electrostatic element 335, which attracts the base 334. When the base 334 moves (or bends), the support 332 moves and the resonator 331 is moved (and therefore displaced) relative to the first waveguide 310.

Wavelength Selective Coupling

FIG. 4 (collectively including FIGS. 4A, 4B, 4C, and 4D) shows a diagram of another system including mechanically actuated evanescent-wave coupled optics.

Figure 4A:
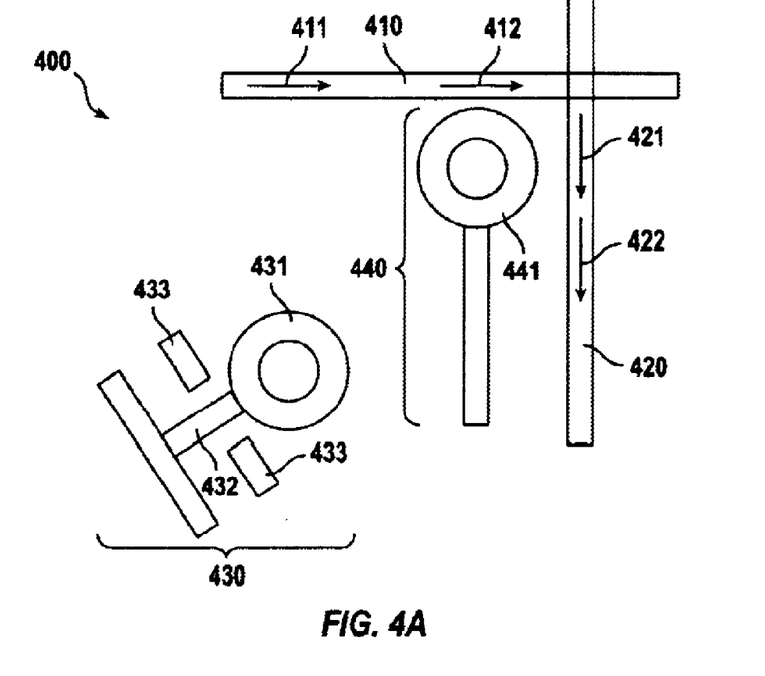

FIG. 4A shows a diagram in a first configuration, with a resonator separated from a first waveguide and a second waveguide.

Figure 4B:
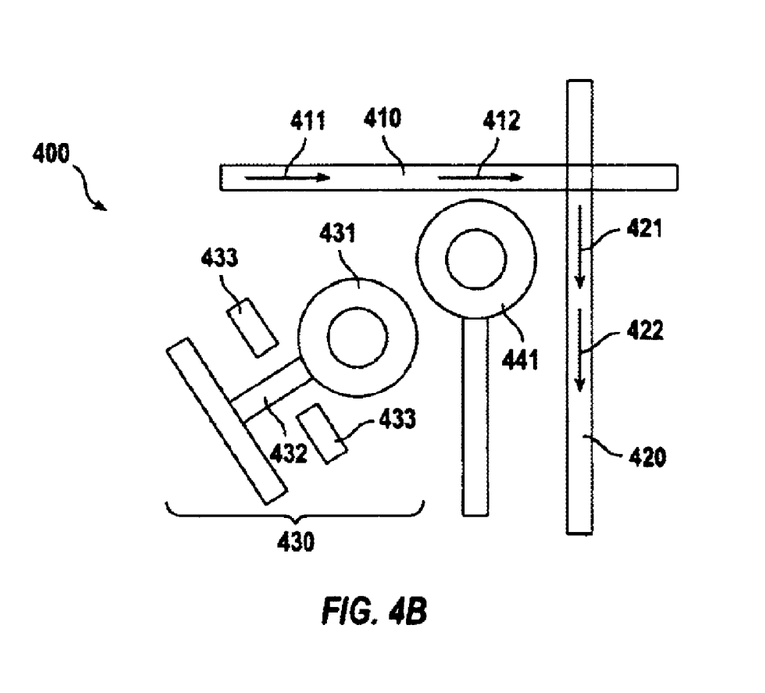

FIG. 4B shows a diagram of the system in a second configuration, with the resonator coupling the first waveguide and the second waveguide.

A system 400 includes a first waveguide 410 and a second waveguide 420, a movable resonator 430, and a coupler 440.

Similar to the waveguide 110, the first waveguide 410 is disposed on a substrate, such as a monolithic integrated silicon substrate (also known as an integrated circuit or a chip), and is disposed for carrying optical energy along the waveguide. Similar to the waveguide 110, the waveguide 410 might be constructed using gallium arsenide and aluminum gallium arsenide, and might be constructed using a ridge waveguide configuration or a slab waveguide configuration.

In alternative embodiments, a grating may be introduced onto the first waveguide 410, the second waveguide 420, the movable resonator 430, or the coupler 440, by deposition (or other methods of placement) of electrodes onto those structures. Using such a grating, an electro-optic effect may be used to alter the refractive index (or other optical properties) for the materials used in those structures, with the effect of altering the refractive index n of the wavelength of optical energy that is used. Changing the refractive index n has an effect on the disposition of optical energy within those structures. In further alternative embodiments, other techniques may be used to alter the refractive index n, such as doping, heating or cooling, acoustical wave energy, optical energy, and various other techniques.

Similar to the waveguide 110, in one embodiment, the waveguide 410 has a width of approximately 0.35 microns.

A first set of waveforms 411 and 412 represent optical energy within the first waveguide 410, including one waveform 411 at a first wavelength and one waveform 412 at a second wavelength.

Similar to the waveguide 120, the second waveguide 420 is disposed on the same substrate as the first waveguide 410, and has the same or similar material, form, and size.

A second set of waveforms 421 and 422 represent optical energy within the second waveguide 420, including one waveform 421 at a first wavelength and one waveform 422 at a second wavelength.

Similar to the waveguide 120, in one embodiment, the second waveguide 420 is disposed at a substantial angle (such as approximately perpendicular) to the first waveguide 410, and is disposed on a layer different from the first waveguide 410, so that the first waveguide 410 and the second waveguide 420 are not optically coupled without use of the movable resonator 430 and the coupler 440. However, there is no particular requirement that the first waveguide 410 and the second waveguide 420 must be at angles to each other; the invention is also applicable to forms in which the first waveguide 410 and the second waveguide 420 are parallel or skew.

Similar to the resonator 130, the coupler 430 includes a coupler resonator 441. The coupler resonator 441 is disposed in a substantially fixed location relative to the first waveguide 410 and the second waveguide 420. Similar to the ring resonator 131, there is no particular requirement that the coupler resonator 431 must be a ring; it may be shaped like a disk, a sphere, a polygon, a line segment, an irregular shape, or any other structure having the operative capability of coupling with the first waveguide 110, the second waveguide 120, and the coupler 440 using evanescent wave coupling.

Similar to the resonator 130, the movable resonator 130 includes a ring resonator 431, a support 432, and an actuator 433. When positioned relatively close to the coupler 440, the ring resonator 431 causes optical coupling among the first waveguide 410, the second waveguide 420, the coupler 440, and the resonator 431 itself, using evanescent wave coupling. When positioned relatively distant from the first waveguide 410 and the second waveguide 420, the ring resonator 431 does not cause optical coupling.

When the ring resonator 431 causes optical coupling among the first waveguide 410 and the second waveguide 420, and the resonator 431 itself, the optical coupling induces energy transfer between the first waveguide 410 and the second waveguide 420. However, the energy transfer is substantially restricted to a range of wavelengths, responsive to the sizes of the resonator 430 and the coupler 440.

Wavelength-Selective Filtering

In one configuration, the system 400 may include the first waveguide 410 and the second waveguide 420, the resonator 430, and the coupler 440, but with the resonator 430 disposed in a substantially fixed position relative to the first waveguide 410, the second waveguide 420, and the coupler 440. In this alternative embodiment, energy transfer between the first waveguide 410 and the second waveguide 420 is not restricted to times when an actuating signal causes the first waveguide 410 and the second waveguide 420 to be coupled, but is substantially constant. However, energy transfer is substantially restricted to a range of wavelengths;

in this alternative embodiment the system 400 acts to filter optical energy between the first waveguide 410 and the second waveguide 420.

The filtering effect of the system 400 in this configuration is responsive to several factors, including A diameter (or shape) of the ring for the resonator 430;

A diameter (or shape) of the ring for the coupler 440; and

Distances among the elements of the system 400, including

A distance between the resonator 430 and the first waveguide 410;

A distance between the resonator 430 and the second waveguide 420;

A distance between the resonator 430 and the coupler 440; and

Other distances between and among elements of the system 400.

More specifically, the range of wavelengths passed by the filter includes a central wavelength $\lambda_0$ and a full width half-maximum width $s_0$. The full width half-maximum width $s_0$ is a value such that the energy passed by the filter at the offset wavelengths ($\lambda_0 \pm s_0$) is half the energy passed by the filter at the central wavelength $\lambda_0$. The central wavelength $\lambda_0$ is responsive to the diameter of the resonator 430, while the width $s_0$ is responsive to the distance $d_0$ between the resonator 430 and the first waveguide 410 and the distance $d_0$ between the resonator 430 and the second waveguide 420.

When the resonator 430 has two different distances $d_0^a$, $d_0^b$ (not shown) from the first waveguide 410 and the second waveguide 420 respectively, optical energy is partially transferred between the first waveguide 410 and the second waveguide 420, with the filter thus also having the effect of a splitter or attenuator.

The filtering effect of the system 400 is tunable by any one of the following:

Selecting a size for the resonator 430 or the coupler 440;

Selecting a distance between the resonator 430 or the coupler 440; or

Mechanically moving the resonator 430 or the coupler 440 to alter the distance between the two.

The filtering effect can be selected to meet desired criteria whether or not construction of the resonator 430 or the coupler 440 meet specifications or tolerances decided upon ahead of time. Moreover, construction results which are in error (that is, do not meet specifications or tolerances decided upon ahead of time) by asymmetrically placing the resonator 430 with regard to the first waveguide 410 and the second waveguide 420 respectively (with the result that there are two different distances $d_0^a$, $d_0^b$ as described above) can be corrected by mechanically moving the resonator 430.

The filtering effect can also be selected to meet desired criteria whether construction errors were due to any of the following effects (or combinations thereof):

Errors in manufacturing patterning (lithography and etching)

Errors in manufacturing placement;

Errors in manufacturing resulting in asymmetrical placement (of a waveguide, resonator, or coupler);

Errors in manufacturing resulting in sidewall roughness (of a waveguide, resonator, or coupler); or Errors in manufacturing tolerance.

Those skilled in the art will recognize, after perusal of this application, that these techniques for compensating for manufacturing can be used not only for filtering effects, but also for attenuation, modulation, switching, and all other effects shown herein, and that all such effects are within the scope and spirit of the invention.

Figure 4C:
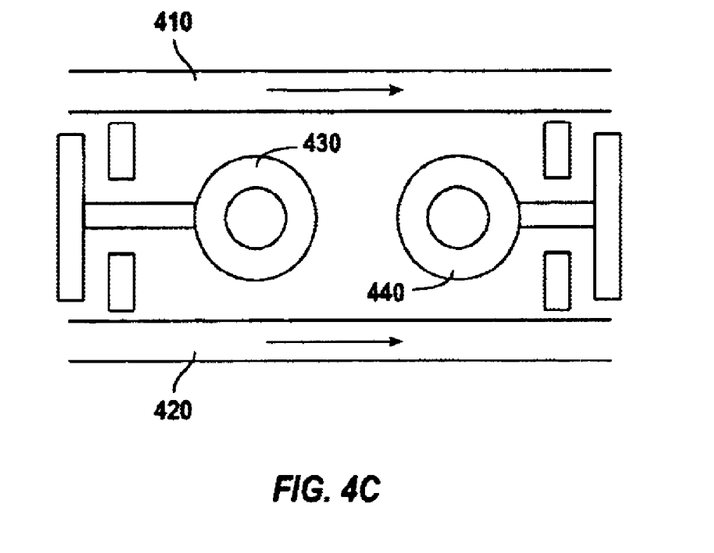

FIG. 4C shows a diagram of the system in a third configuration, with the resonator and the coupler used to produce a tunable filtering effect between the first waveguide and the second waveguide.

A similar effect can be achieved when the first waveguide 410 and the second waveguide 420 are disposed substantially parallel to each other. In this alternative configuration, optical energy transfer between the first waveguide 410 and the second waveguide 420 is responsive to a position of a coupler 440 disposed between the two. The optical energy transfer (both its attenuation and filtering over selected wavelengths) can be tuned using the resonator 430 when mechanically actuated to change its position relative to the first waveguide 410, the second waveguide 420, or the coupler 440. In this alternative configuration, the first waveguide 410 and the second waveguide 420 are substantially parallel, the coupler 440 is disposed between them (or above or below them in a multi-layer structure) and the resonator 430 can be moved relative to them (either next to them or above or below them in a multi-layer structure).

Those skilled in the art will recognize, after perusal of this application, many variations of this effect, which are within the scope and spirit of the invention. The following possibilities are exemplary:

More than two waveguides can be used, with the effect of optical energy coupling (both attenuation and filtering) among pairs of such waveguides;

More than one coupler 440 can be used, with the effect that the frequency response of the filtering effect can be adjusted. For example, the frequency response of the filtering effect can be made relatively flatter and with steeper roll-off, so that the frequency response is closer to a square response.

More than one resonator 430 can be used, with the effect that the frequency response of the filtering effect can be both coarsely and finely adjusted.

The resonator 430 can be made responsive to a control or data signal, with the effect that the frequency response can be used to modulate one or more optical energy signals in response to such a control or data signal.

Figure 4D:
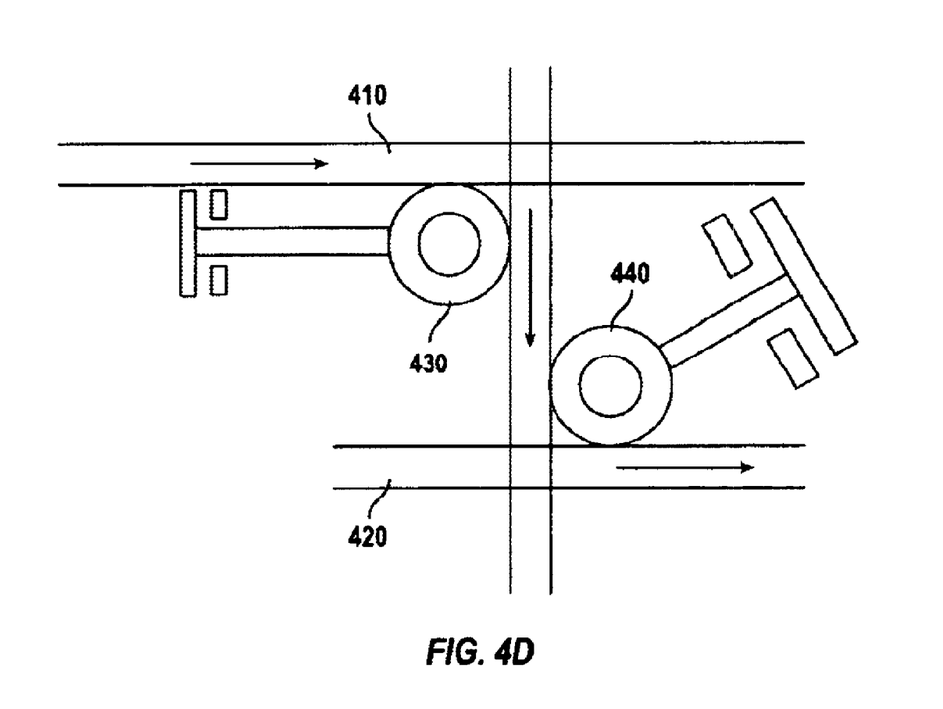

FIG. 4D shows a diagram of the system in a fourth configuration, with multiple resonators and couplers used to produce a set of sequential (convolved) filtering effects.

Multiple filters can be disposed with sequential effect, so that the effects of multiple filters are convolved to produce a single filtering effect.

Integrated Optical Circuits

Figure 5A:
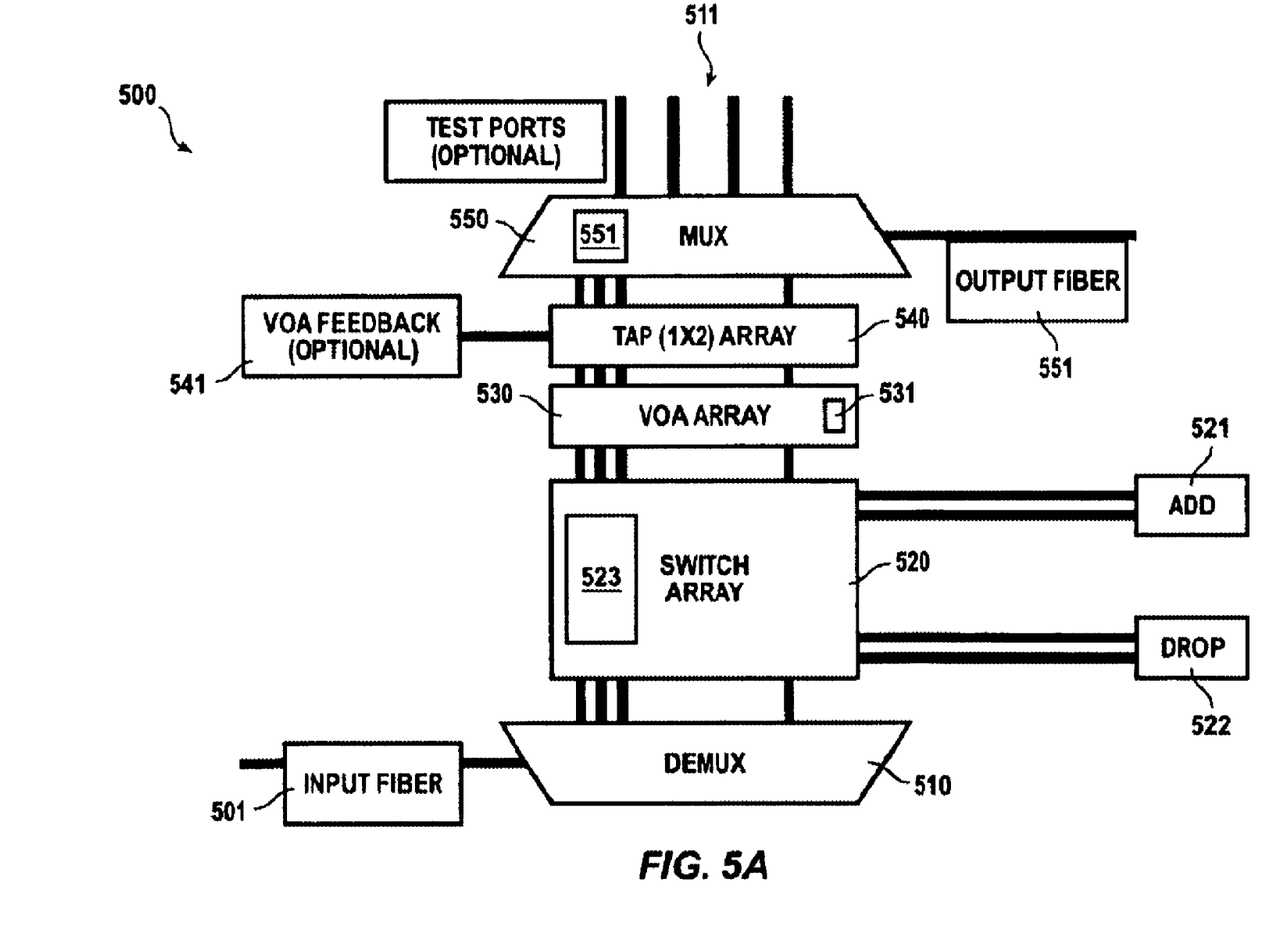
Figure 5B:
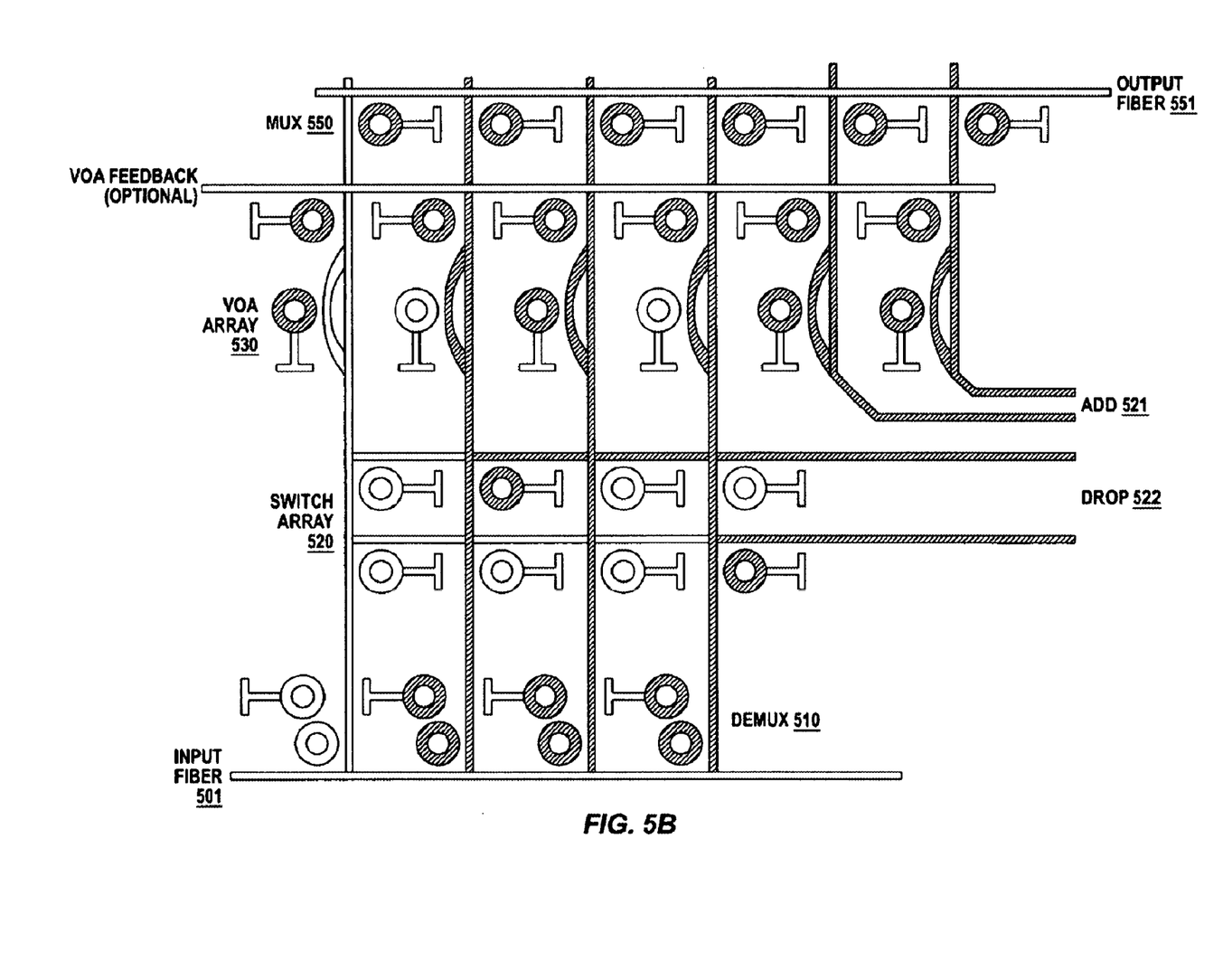

FIG. 5 (collectively including FIGS. 5A and 5B) shows a block diagram of an OADM (optical add-drop module) including mechanically actuated evanescent-wave coupled optics.

FIG. 5A shows a relatively higher-level block diagram, including elements of the OADM.

FIG. 5B shows a relatively lower-level block diagram, including elements of the OADM.

A system 500 includes an input fiber 501, a demultiplexer 510, a set of wavelength-specific test lines 511, a switch array 520, a set of add lines 521, a set of drop lines 522, a VOA (variable optical attenuator) array 530, a tap array 540, an (optional) VOA feedback line 541, a multiplexer 550, and an output fiber 551.

The system 500 includes a waveguide similar to the first waveguide 110. The input fiber 501 is disposed to receive control or data signals in an electrical form from an external supplier of those signals (not shown).

The input fiber 501 is coupled to the demultiplexer 510.

The demultiplexer 510 is disposed to separate optical energy on the input fiber 501 into a set of wavelength-specific components, each defined by a selected range of wavelengths. Thus, when the input fiber 501 includes optical energy having a set of wavelength-specific components using WDM (wavelength division multiplexing), the demultiplexer 510 separates out the individual wavelength-specific components.

The demultiplexer 510 includes a set of wavelength-specific communication lines 511, each coupled to the input fiber 501 and coupled to a wavelength-specific filter 512. The wavelength-specific filter 512 is disposed using a filter such as shown above, having at least one (and in one embodiment, two or more) resonator rings 513, disposed with the effect of filtering and transferring optical energy from the input fiber 501 to each of the wavelength-specific communication lines 511, but each only within the selected wavelengths for its specific wavelength-specific communication line 511.

The wavelength-specific communication lines 511 are coupled to the switch array 520.

The switch array 520 includes a set of wavelength-specific filter/transfer elements 523, each coupled to one of the wavelength-specific communication lines 511 and to either the add lines 521 or the drop lines 522. Thus, when an individual wavelength-specific communication line 511 includes optical energy to be added or dropped, the associated wavelength-specific filter/transfer element 523 couples the optical energy to be added from the add lines 521 or couples the optical energy to be dropped to the drop lines 522. The switch array 520 has the effect of causing each wavelength-specific communication line 511 to have optical energy added to it, dropped from it, or passed through it, as selected by the designer of the system 500. The specific selection of adding or dropping might be predetermined (such as if the wavelength-specific filter/transfer elements 523 are fixed in position) or might be modulated by a control or data signal (such as if the wavelength-specific filter/transfer elements 523 are actuated in response thereto).

The switch array 520 is coupled to the add lines 521 and the drop lines 522.

The wavelength-specific communication lines 511 are coupled from the switch array 520 to the VOA array 530.

The VOA array 530 includes a set of attenuator elements 531, each coupled to one of the wavelength-specific communication lines 511 and disposed to attenuate optical energy in its associated wavelength-specific communication line 511. The specific degree of attenuation might be predetermined (such as if the attenuator elements 531 are fixed in position) or might be modulated by a control or data signal (such as if the attenuator elements 531 are actuated in response thereto).

The wavelength-specific communication lines 511 are coupled from the VOA array 530 to the tap array 540.

The tap array 540 includes a set of energy transfer elements 542, each coupled to one of the wavelength-specific communication lines 511 and disposed to transfer optical energy from its associated coupled to one of the wavelength-specific communication line 511 to the VOA feedback line 541. The specific selection and degree of transfer might be predetermined (such as if the transfer elements 542 are fixed in position) or might be modulated by a control or data signal (such as if the transfer elements 542 are actuated in response thereto).

The tap array 540 electrically controls the (optional) VOA via a feedback line 541.

The wavelength-specific communication lines 511 are coupled from the tap array 540 to the multiplexer 550.

The multiplexer 550 includes a set of energy transfer elements 552, each coupled to one of the wavelength-specific communication lines 511 and disposed to transfer optical energy from its associated wavelength-specific communication line 511 to the output fiber 551.

The multiplexer 550 is coupled to the output fiber 551.

Alternative Embodiments

Although preferred embodiments are disclosed herein, many variations are possible which remain within the concept, scope, and spirit of the invention to realize any optical integrated circuit. These variations would become clear to those skilled in the art after perusal of this application.

Elements described herein can be disposed to form one or more of the following:

A delay line, in which a first signal including optical energy is delayed relative to a second signal;

Multiple elements might be disposed to form one or more optical logical circuits, actuated in response to electromagnetic or optical control or data signals, with the effect of providing an optical computation element, an optical micro-processor, an optical signal processor, and the like.

Multiple elements might be disposed to form one or more sensing circuits, actuated in response to electromagnetic or optical control or data signals, or in response to chemical or other effects on elements coupled to electromagnetic or optical elements (such as for example elements whose electrical or optical properties change with exposure to selected chemical or biochemical substances) with the effect or providing optical sensing of minutes quantities of substances (such as chemical substances, biochemical substances, biological substances, radiological substances, or combinations or mixtures thereof), sensing of physical effects such as pressure vibrations, acceleration, and shock, sensing of biological substances such as blood, DNA and the like, and sensing of radiological effects such as the presence of alpha, beta, or gamma radiation.

A phase shifter, in which a signal including optical energy has a phase shift relative to a second signal;

A directional coupler, in which a signal including optical energy can be coupled from a first waveguide to one of a plurality of second waveguides;

A dispersion compensator;

An attenuator, in which a signal including optical energy is attenuated relative to its incoming energy;

A modulator, in which a signal including optical energy is modulated relative to a control or data signal.

Filter elements described herein can be disposed to shape a filter response, such as to provide a filter with a relatively flat top and a relatively steep roll-off, with the effect of providing a substantially rectangular response and can be tuned using the electro-optic effect, thermo-optic effect and other physical effects.

Elements described herein, such as resonators (ring resonators or otherwise) and waveguide sections, can be disposed in parallel or series, or in combinations of multiple stages, to form combinations of filters or other elements. The following possibilities are exemplary:

Multiple filters can be combined to form a combined filter with desired characteristics;

Multiple switches can be combined to form a combined switch with desired characteristics;

Filters and switches can be combined to from switches that switch only selected frequencies;

Filters and switches can be combined to form filters that operates only with selected data or signals.

Those skilled in the art will recognize, after perusal of this application, that these alternative embodiments are illustrative and in no way limiting.

What is claimed is:

1. Apparatus including
a substrate having at least a first region and a second region of optical medium thereon;
a moving part coupled to an element on said substrate; and
an optical energy wave being at least sometimes evanescent wave coupled between said first region, said moving part, and said second region, a degree of said evanescent wave coupling being response to said moving part.

2. Apparatus as in claim 1, wherein optical energy in said first region propagates using multi-mode propagation.

3. Apparatus as in claim 1, wherein optical energy in said second region propagates using multi-mode propagation.

4. Apparatus as in claim 1, wherein optical energy in said first region propagates using single-mode propagation.

5. Apparatus as in claim 1, wherein optical energy in said second region propagates using single-mode propagation.

6. Apparatus as in claim 1, wherein said optical medium includes at least one of: a doped waveguide structure, a ridge waveguide structure, a slab waveguide structure, an induced waveguide structure using an electro-optic effect or thermo-optic effect.

7. Apparatus as in claim 1, wherein said moving part includes at least one of: a semiconducting material, a dielectric material, an electro-optic material, a ferroelectric material, a ferromagnetic material, a piezoelectric material, a polymer, a thermoelectric material.

8. Apparatus as in claim 1, wherein said substrate includes at least one of: a semiconductor material, a dielectric material, an electro-optic material a ferroelectric material, a ferromagnetic material, a piezoelectric material, a polymer, a thermoelectric material.

9. Apparatus as in claim 1, wherein said substrate includes a monolithic substrate having circuits integrated thereon.

10. Apparatus as in claim 1, wherein changing a position of said moving part has an effect on a distance between at least two of: said first region, said second region, an optical element separate from said first region and said second region.

11. Apparatus as in claim 10, wherein changing a position of said moving part includes at least one of: angular motion of said optical element, linear motion of said optical element.

12. Apparatus as in claim 10, wherein changing a position of said moving part includes at least one of: moving said first region, moving said second region, moving said optical element.

13. Apparatus as in claim 1, wherein said moving part is responsive to an actuator.

14. Apparatus as in claim 13, wherein said actuator includes at least one of: an electrostatic effect, an electromagnetic effect, a magnetic effect, a piezoelectric effect, a thermal effect.

15. Apparatus as in claim 1, wherein
optical energy is transferred between said first region and said second region; and
said transfer is responsive to a position of said moving part.

16. Apparatus as in claim 15, wherein a passband of said transfer is tunable responsive to said position to be substantially restricted to a range of wavelengths.

17. Apparatus as in claim 15, wherein a passband of said transfer is tunable responsive to said position to be substantially wideband.

18. Apparatus as in claim 1, wherein said optical medium includes a waveguide.

19. Apparatus as in claim 18, wherein said waveguide includes at least one of: silicon-on-insulator, gallium arsenide, aluminum arsenide, indium phosphide and compounds thereof, gallium nitride, glass, lithium, niobate, and polymers.

20. Apparatus as in claim 18, wherein said waveguide includes ternary or quaternary compounds comprised of elements from the III–V family in the periodic chart.

21. Apparatus as in claim 1, wherein said moving part includes an optical element responsive to said optical energy wave.

22. Apparatus as in claim 21, wherein said moving part includes at least one of: a portion of a waveguide, a resonator.

23. Apparatus as in claim 21, wherein said optical element includes at least one of: a disk, a ring, a segment of a waveguide.

24. Apparatus including
a monolithic semiconductor substrate having at least a first region and a second region of optical medium integrated thereon;
a moving part coupled to an element integrated onto said substrate; and
an optical energy wave being at least sometimes evanescent wave coupled between said first region, said moving part, and said second region, a degree of said evanescent wave coupling being responsive to said moving part.

25. Apparatus as in claim 24, wherein
a propagation parameter of optical energy in said first region is responsive to said degree of coupling; and
said propagation parameter is at least one of: amplitude or intensity, phase group velocity, wave-vector properties, energy distribution across frequencies.

26. Apparatus as in claim 25, wherein
optical energy in said first region is manipulated responsive to said propagation parameter; and
said manipulation is at least one of: modulation, sensing, switching, filtering, attenuation, amplification.

27. Apparatus as in claim 25, wherein said propagation parameter has an effect on at least one of: an interferometer, a Mach-Zehnder device.

28. A method including steps of
disposing at least a first region and a second region of optical medium on a substrate; and
physically moving a moving part coupled to an element on said substrate;
wherein an optical energy wave is at least sometimes evanescent wave coupled between said first region, said moving part, and said second region in response to said moving part.

29. A method as in claim 28, including steps of altering, in response to said steps of physically moving, a distance between at least two of: said first region, said second region, an optical element separate from said first region and said second region.

30. A method as in claim 28, including steps of propagating optical energy in said first region using multi-mode propagation.

31. A method as in claim 28, including steps of propagating optical energy in said second region using multi-mode propagation.

32. A method as in claim 28, including steps of propagating optical energy in said first region using single-mode propagation.

33. A method as in claim 28, including steps of propagating optical energy in said second region using single-mode propagation.

34. A method as in claim 28, wherein said steps of physically moving include at least one of: angular motion of said optical element, linear motion of said optical element.

35. A method as in claim 28, wherein said steps of physically moving include at least one of: moving said first region, moving said second region, moving said optical element.

36. A method as in claim 28, wherein said moving part is responsive to an actuator.

37. A method as in claim 36, wherein said actuator includes at least one of: an electrostatic effect, an electro-magnetic effect, a magnetic effect, a piezoelectric effect, a thermal effect.

38. A method as in claim 28, including steps of transferring optical energy between said first region and said second region in response to a position of said moving part.

39. A method as in claim 38, including steps of filtering said optical energy in a range of wavelengths.

40. A method as in claim 38, wherein said moving part includes an optical element responsive to said optical energy wave.

41. A method as in claim 40, wherein said moving part includes at least one of: a portion of a waveguide, a resonator.

42. A method as in claim 40, wherein said optical element includes at least one of: a ring, a segment of a waveguide.

43. Apparatus including
  a substrate having at least a region of optical medium thereon;
  a moving part coupled to an element on said substrate; and
  an optical energy wave being at least sometimes evanescent wave coupled between said region and said moving part;
  wherein a passband for said optical medium is tunable responsive to a position of said moving part.

44. Apparatus as in claim 43, wherein said passband is tunable to be substantially restricted to a range of wavelengths.

45. Apparatus as in claim 43, wherein said passband is tunable to be substantially wideband.

46. Apparatus as in claim 43, wherein said optical medium includes at least one of: a doped waveguide structure, a ridge waveguide structure, a slab waveguide structure, an induced waveguide structure using an electro-optic effect or thermo-optic effect.

47. Apparatus as in claim 43, wherein said moving part includes at least one of: a semiconducting material, a dielectric material, an electro-optic material, a ferroelectric material, a ferromagnetic material, a piezoelectric material, a polymer, a thermoelectric material.

48. Apparatus as in claim 43, wherein said substrate includes a monolithic substrate having circuits integrated thereon.

49. Apparatus as in claim 43, wherein changing a position of said moving part has an effect on a distance between said region and an optical element separate from said region.

50. Apparatus as in claim 49, wherein changing a position of said moving part includes at least one of: angular motion of said optical element, linear motion of said optical element.

51. Apparatus as in claim 43, wherein said moving part is responsive to an actuator.

52. Apparatus as in claim 51, wherein said actuator includes at least one of: an electrostatic effect, an electro-magnetic effect, a magnetic effect, a piezoelectric effect, a thermal effect.

53. Apparatus as in claim 43, wherein said optical medium includes a waveguide.

54. Apparatus as in claim 43, wherein said moving part includes an optical element responsive to said optical energy wave.

55. Apparatus as in claim 54, wherein said moving part includes at least one of: a portion of a waveguide, a resonator.

56. Apparatus as in claim 54, wherein said optical element includes at least one of: a disk, a ring, a segment of a waveguide.

57. Apparatus as in claim 43, wherein a phase of said optical energy wave in said optical medium is responsive to said moving part.

58. A method including steps of
  disposing at least a region of optical medium on a substrate; and
  physically moving an moving part coupled to an element on said substrate;
  wherein an optical energy wave is at least sometimes evanescent wave coupled between said region and said moving part in response to said moving part; and
  wherein a passband for said optical medium is tunable responsive to a position of said moving part.

59. Method as in claim 58, wherein said passband is tunable to be substantially restricted to a range of wavelengths.

60. Method as in claim 58, wherein said passband is tunable to be substantially wideband.

61. Method as in claim 58, wherein said optical medium includes at least one of: a doped waveguide structure, a ridge waveguide structure, a slab waveguide structure, an induced waveguide structure using an electro-optic effect or thermo-optic effect.

62. Method as in claim 58, wherein said moving part includes at least one of: a semiconducting material, a dielectric material, an electro-optic material, a ferroelectric material, a ferromagnetic material, a piezoelectric material, a polymer, a thermoelectric material.

63. Method as in claim 58, wherein said substrate includes a monolithic substrate having circuits integrated thereon.

64. Method as in claim 58, wherein changing a position of said moving part has an effect on a distance between said region and an optical element separate from said region.

65. Method as in claim 64, wherein changing a position of said moving part includes at least one of: angular motion of said optical element, linear motion of said optical element.

66. Method as in claim 58, wherein said moving part is responsive to an actuator.

67. Method as in claim 66, wherein said actuator includes at least one of: an electrostatic effect, an electro-magnetic effect, a piezoelectric effect, a thermal effect.

68. Method as in claim 58, wherein said optical medium includes a waveguide.

69. Method as in claim 58, wherein said moving part includes an optical element responsive to said optical energy wave.

70. Method as in claim 69, wherein said moving part includes at least one of: a portion of a waveguide, a resonator.

71. Method as in claim 69, wherein said optical element includes at least one of: a disk, a ring, a segment of a waveguide.

72. Method as in claim 58, wherein a phase of said optical energy wave in said optical medium is responsive to said moving part.

* * * * *